(12) United States Patent
Xing et al.

(10) Patent No.: US 11,902,961 B2
(45) Date of Patent: *Feb. 13, 2024

(54) SYSTEMS AND METHODS TO ENHANCE SPECTRUM EFFICIENCY AND TO REDUCE LATENCY BY USING DYNAMIC GUARD TIME SELECTION IN WIRELESS SYSTEMS

(71) Applicant: T-Mobile USA, Inc., Bellevue, WA (US)

(72) Inventors: Shuqing Xing, Bellevue, WA (US); John Humbert, Olathe, KS (US); Scott Francis Migaldi, Cary, IL (US); Neng-Tsann Ueng, Bellevue, WA (US); Brian Allan Olsen, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,391

(22) Filed: Mar. 14, 2022

(65) Prior Publication Data

US 2022/0201717 A1 Jun. 23, 2022

Related U.S. Application Data

(63) Continuation of application No. 16/254,176, filed on Jan. 22, 2019, now Pat. No. 11,277,854.

(51) Int. Cl.
*H04L 5/00* (2006.01)
*H04W 72/04* (2023.01)
(Continued)

(52) U.S. Cl.
CPC ....... *H04W 72/1263* (2013.01); *H04W 24/08* (2013.01)

(58) Field of Classification Search
CPC ......... H04W 72/1263; H04W 56/0015; H04W 24/08; H04W 72/54; H04W 72/0446;
(Continued)

(56) References Cited

U.S. PATENT DOCUMENTS

2007/0019667 A1* 1/2007 Mottier ................ H04B 7/2643
370/458
2009/0147867 A1 6/2009 Okamoto et al.
(Continued)

FOREIGN PATENT DOCUMENTS

WO WO2018202027 11/2018

OTHER PUBLICATIONS

Extended European Search Report dated Sep. 21, 2022 for European Patent Application No. 20744356.5, 10 pages.
(Continued)

*Primary Examiner* — Edan Orgad
*Assistant Examiner* — Vanneilian Lalchinthang
(74) *Attorney, Agent, or Firm* — Lee & Hayes, P.C.

(57) ABSTRACT

Various systems, methods, and devices relate to determining a delay associated with a device; calculating a guard time based at least in part on the delay; and scheduling a wireless resource to include a downlink interval, an uplink interval, and the guard time between the downlink interval and the uplink interval. By calculating the guard time based at least in part on the delay associated with the device, spectrum efficiency can be enhanced, and latency can be reduced.

20 Claims, 9 Drawing Sheets

(51) Int. Cl.
*H04B 7/06* (2006.01)
*H04W 72/1263* (2023.01)
*H04W 24/08* (2009.01)

(58) Field of Classification Search
CPC ........ H04W 72/04; H04L 5/0048; H04L 1/18; H04L 1/1854; H04L 5/0044; H04B 7/0619; H04B 7/0626; H04B 7/0632; H04B 7/0639; H04B 7/0695
USPC .......................................................... 370/319
See application file for complete search history.

(56) References Cited

U.S. PATENT DOCUMENTS

| | | |
|---|---|---|
| 2010/0159950 A1 | 6/2010 | Toh et al. |
| 2010/0202305 A1 | 8/2010 | Wijting et al. |
| 2011/0135300 A1 | 6/2011 | Oyane et al. |
| 2014/0016541 A1 | 1/2014 | Kim |
| 2015/0181612 A1* | 6/2015 | Gan ...................... H04W 72/21 370/329 |
| 2016/0028533 A1* | 1/2016 | Kazmi .............. H04W 56/0045 370/296 |
| 2016/0338081 A1 | 11/2016 | Jiang et al. |
| 2017/0201968 A1 | 7/2017 | Nam et al. |
| 2017/0215188 A1* | 7/2017 | Kim ...................... H04L 5/0091 |
| 2018/0070381 A1* | 3/2018 | Lei .......................... H04L 1/004 |
| 2018/0254851 A1* | 9/2018 | Roessel ................ H04L 1/1861 |
| 2018/0375636 A1* | 12/2018 | You ........................ H04W 72/20 |
| 2019/0068352 A1* | 2/2019 | Xiong ................... H04L 5/0051 |
| 2019/0132098 A1* | 5/2019 | Wernersson ......... H04B 7/0695 |
| 2019/0373621 A1* | 12/2019 | Jiang ..................... G01S 5/0236 |
| 2020/0092871 A1* | 3/2020 | Axnäs ............... H04L 27/26025 |
| 2020/0128576 A1* | 4/2020 | Jung ..................... H04L 1/1812 |
| 2020/0236693 A1 | 7/2020 | Xing et al. |

OTHER PUBLICATIONS

Office Action for U.S. Appl. No. 16/254,176, dated Jan. 8, 2021, Xing, "ystems and Methods to Enhance Spectrum Efficiency and to Reduce Latency by Using Dynamic Guard Time Selection in Wireless Systems", 24 pages.

Non Final Office Action dated Jul. 10, 2020 for U.S. Appl. No. 16/254,176 "Systems and Methods to Enhance Spectrum Efficiency and to Reduce Latency by Using Dynamic Guard Time Selection in Wireless Systems" Xing, 26 pages.

Office Action for U.S. Appl. No. 16/254,176, dated Jul. 12, 2021, Xing, "Systems and Methods to Enhance Spectrum Efficiency and to Reduce Latency by Using Dynamic Guard Time Selection in Wireless Systems" 21 pages.

PCT International Preliminary Report on Patentability, PCT/US2020/012675, dated Aug. 5, 2021, 8 pages.

The PCT Search Report and Written Opinion dated May 11, 2020 for PCT Application No. PCT/US2020/012675, 11 pages.

Thales et al., "NR-NTN: Chap 7.3.—NR modifications to support the Non-Terrestrial Network deployment scenarios", R1-1807794, 3GPP TSG RAN1 Meeting #93, Busan, Korea, May 29, 2018, reference pulled from KIPO PCT Portal includes comments, 44 pages.

Thales et al., "NR-NTN: solution principles for NR to support non-terrestrial networks", R1-1807864, #GPP TSG RAN1 Meeting #93, Busan, Korean, May 29, 2018, reference pulled from KIPO PCT Portal includes comments, 13 pages.

\* cited by examiner

SYSTEMS AND METHODS TO ENHANCE SPECTRUM EFFICIENCY AND TO REDUCE LATENCY BY USING DYNAMIC GUARD TIME SELECTION IN WIRELESS SYSTEMS

CROSS-REFERENCE TO RELATED APPLICATION

This application is a continuation of and claims priority to U.S. application Ser. No. 16/254,176, filed on Jan. 22, 2019, and entitled "Systems and Methods to Enhance Spectrum Efficiency and to Reduce Latency by Using Dynamic Guard Time Selection in Wireless Systems" the entirety of which is incorporated herein by reference.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies, as well as other next-generation cellular-wireless access technologies (such as sixth generation (6G) cellular-wireless access technologies), to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number can identify the figure in which the reference number first appears. The use of the same reference numbers in different figures indicates similar or identical items or features.

DETAILED DESCRIPTION

Figure 1:
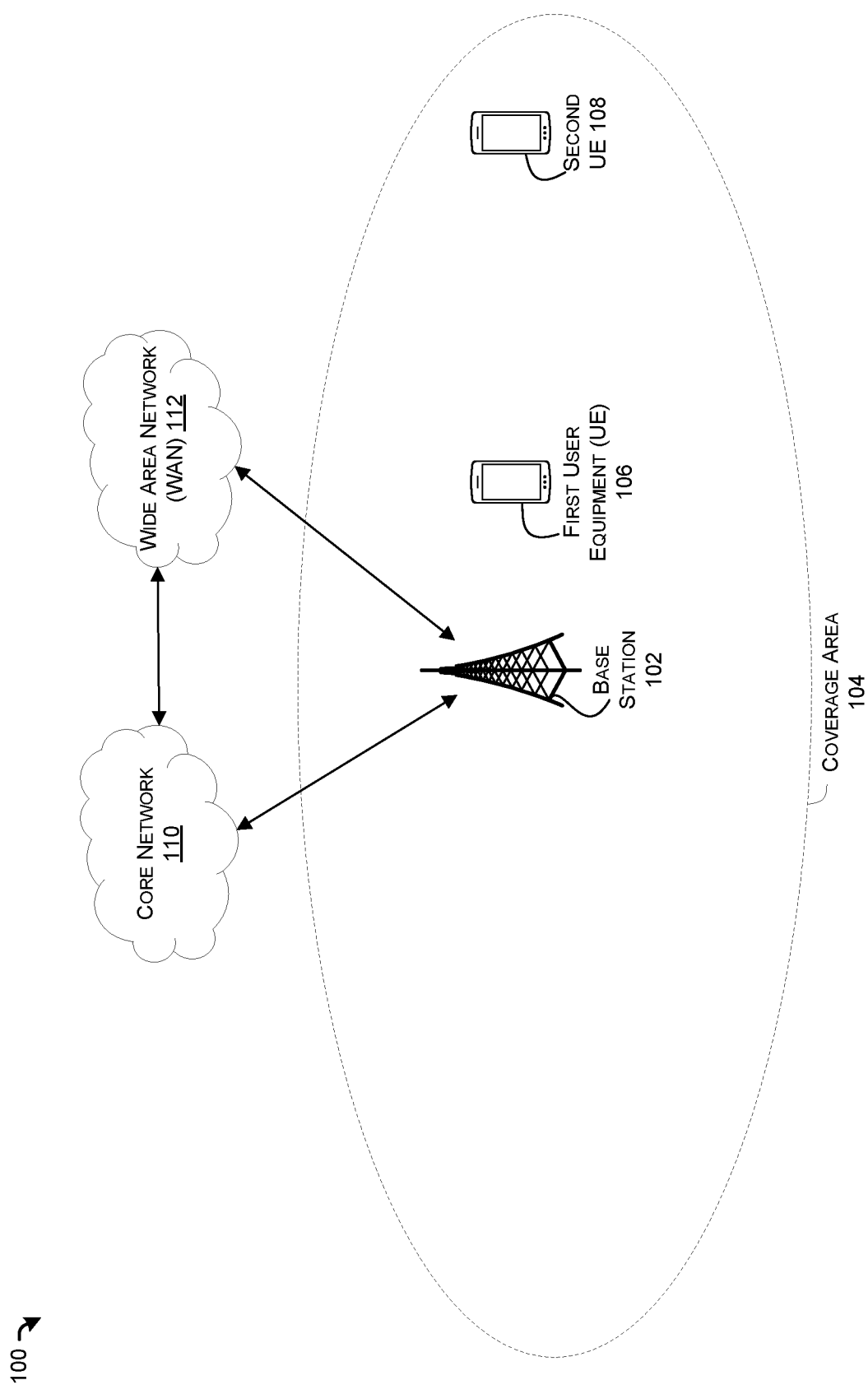
FIG. 1 illustrates an example environment including a base station implementing dynamic guard band selection according to implementations of the present disclosure.

Various implementations of the present disclosure relate to systems, methods, and devices for dynamic guard time selection.

In a wireless system, downlink data can be transmitted via a wireless resource from a base station to a device and uplink data can be transmitted via the wireless resource from the device to the base station. To ensure that the downlink data and the uplink data do not occupy the wireless resource contemporaneously, the downlink data and the uplink data can be scheduled to occupy the wireless resource during different time intervals.

Transmitted radio signals may have a finite speed (e.g., the speed of light). Accordingly, a radio signal can be transmitted and received at different time points when the transmitter and the receiver are separated by a nonzero distance. Thus, a time interval in which the base station is actively transmitting the downlink data can be different than a time interval in which the device receives the downlink data. Similarly, a time interval in which the device is actively transmitting the uplink data can be different than a time interval in which the base station receives the uplink data.

In addition, in many cases, devices cannot instantaneously transition between receiving data and transmitting data, or vice versa. For example, a device may require a nonzero amount of time to process the data it receives before it is capable of transmitting data. In certain examples, a device may also require a nonzero amount of time to switch between a receiving functionality and a transmitting functionality.

To account for these and other delays, a guard time can be scheduled between a transmission interval for the downlink data and a transmission interval for the uplink data. During the guard time, the device and base station refrain from transmitting data, thereby preventing collisions in the wireless resource.

The guard time could be defined statically, such that the same guard time is applied to various devices. Such a static guard time can be of a sufficient length to account for propagation delays of devices that are at an edge of a coverage area, as well as to account for device delays of devices with relatively slow processing and switching times. However, for a device that is located anywhere between the edge of the coverage area and/or that has faster processing and switching times, the static guard time can be longer than necessary to account for the propagation delay and/or the device delay associated with the device. When the guard time occupies more of the wireless resource than necessary, the guard time can prevent the maximum utilization of the wireless resource for data transmission and can lower throughput.

According to various implementations of the present disclosure, a guard time can be dynamically selected based on delay(s) that are specifically associated with the device. By dynamically selecting the guard time, spectrum efficiency can be enhanced, operation costs of the network can be reduced, cell capacity can be increased, and air interface latency can be reduced.

Various implementations of the present disclosure solve specific problems associated with wireless networks. One such problem relates to collisions. When downlink data and uplink data occupy the same wireless resource at the same time, it may be difficult for devices to discern the downlink data and/or the uplink data. By scheduling a guard time between a transmission time for the downlink data and a transmission time for the uplink data, the downlink data and the uplink data can be prevented from occupying the same wireless resource at the same time, thereby preventing collisions in the wireless resource.

Another problem relates to spectrum efficiency. As the duration of a scheduled guard time increases, the amount of the wireless resource used to transmit data decreases. Implementations of the present disclosure address this problem by minimizing the guard time, thereby increasing the amount of the wireless resource available for the transmission of data.

Various implementations of the present disclosure represent technical improvements to the field of wireless networks. In contrast to statically selecting a guard time, dynamically selecting a guard time can reduce an amount of a wireless resource devoted to the guard time and can thereby increase spectrum efficiency and reduce latency.

The systems, devices, and techniques described herein can be implemented in a number of ways. The various functions, gateways, nodes, and components discussed herein can be implemented either as a network element on a dedicated hardware, as a software instance running on a dedicated hardware, or as a virtualized function instantiated on an appropriate platform, such as a cloud infrastructure.

Example implementations are provided below with reference to the following figures.

FIG. 1 illustrates an example environment 100 including a base station 102 implementing dynamic guard band selection according to implementations of the present disclosure.

The terms "base station," "access point (AP)," or their equivalents, can refer to one or more devices that can transmit and/or receive wireless services to and from one or more UEs in a coverage area. For example, a base station can be implemented as a variety of technologies to provide wired and/or wireless access to the network, as discussed herein. In some instances, a base station can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, a base station can include any number and type of transceivers and/or base stations representing any number and type of macrocells, microcells, picocells, or femtocells, for example, with any type or amount of overlapping coverage or mutually exclusive coverage.

The base station 102 can be associated with coverage area 104. In some instances, the coverage area 104 can correspond to a geographic region where wireless communications are supported by the base station 102. For example, coverage area 104 is a region where base station 102 can transmit and/or receive data wirelessly by utilizing one or more wireless resources.

The term "wireless resource," or its equivalents, may include a resource over which data can be transmitted wirelessly. A wireless resource can include at least one of one or more wireless bands, one or more channels, one or more sub-channels, one or more carriers, one or more sub-carriers, etc. In some implementations, a wireless resource can include a frame, a slot, or a combination thereof.

Although coverage area 104 is illustrated as a single geographic region, in some implementations, coverage area 104 includes multiple coverage areas corresponding respectively to multiple frequency bands. In some instances, lower frequency wireless resources can be transmitted over a broader coverage area than higher frequency wireless resources.

In some instances, the base station 102 may be associated first User Equipment (UE) 106 and second UE 108, which are each located in the coverage area 104. The terms "user equipment (UE)," "user device," "wireless communication device," "wireless device," "communication device," "mobile device," and "client device," can be used interchangeably to describe any UE that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing IP-based network technology. Examples of UEs can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

Because the first and second UEs 106 and 108 are located in the coverage area 104, the first and second UEs 106 and 108 can communicate wirelessly with the base station 102. For example, any of the first and second UEs 106 and 108 can wirelessly transmit a request for services, an attachment request, uplink data, and the like, to the base station 102 via one or more wireless resources. The base station 102 may wirelessly transmit various requests, downlink data, and the like, any of the first and second UEs 106 and 108. The base station 102 can provide services to the first and second UEs 106 and 108 over wireless resources available to the base station 102.

In various implementations, the base station 102 is configured to provide services between UEs (e.g., UEs 106 and 108) and a core network 110. As used herein, the term "core network," "carrier network, or their equivalents, can refer to an architectural framework for providing services to one or more UEs. A core network, for example, can provide services to a UE from a wide area network (WAN) 112, such as the Internet. In some instances, the core network is an IP Multimedia Subsystem (IMS) core (sometimes referred to as an "IMS core network," an "IMS network," a "Core Network (CN)," or an "IM CN Subsystem"). In some cases, the core network is a 5G core network. IMS and the 5G core network are architectural frameworks defined by the $3^{rd}$ Generation Partnership Project (3GPP) for delivering Internet Protocol (IP) multimedia to a UE. The IMS or 5G core can be maintained and/or operated by one or more service providers, such as one or more wireless carriers ("carriers"), that provide IMS-based services to a user who is associated with the UE. For example, a service provider can offer multimedia telephony services that allow a user to call or message other users via the IMS or 5G core using his/her UE. A user can also utilize an associated UE to receive, provide, or otherwise interact with various different IMS-based services by accessing the IMS or 5G core. It is to be appreciated that any number of base stations, such as base station 102, and/or IMS nodes can be included in the IMS network.

An operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request the services. For example, the UE may be configured to request establishment of a communication session. In the case of telephony services, the communication session can comprise a call (e.g., a voice-based communication session, such as a VoLTE call, or a Wi-Fi call).

In some implementations, the base station 102 receives a request for services from a UE, e.g., UE 110. The base station 102 forwards the request to the core network 114. In response, the core network 114 returns the requested services, and the services are delivered to the UE 110 over one or more available wireless resources. The one or more available wireless resources may be part of wireless resources allocated to the base station 102 by the network manager 104. In some implementations, the base station 102 provides both uplink and downlink data between the UE 110 and the core network 114 via one or more uplink and downlink wireless resources, e.g., channels. Accordingly, a base station 102 may "provide services" to a UE by receiving data from the UE over one or more UL resources and/or delivering data to the UE over one or more downlink resources.

In various implementations, the base station 102 is configured to route data between UEs (e.g., UEs 106 and 108) and the WAN 112. For example, data transmitted between the either of the UEs 106 and 108 and the WAN 112 can bypass the core network 110, in some implementations.

In response to receiving a request for services from the first UE 106, the base station 102 can be configured to schedule a wireless resource for which to provide the services to the first UE 106. In some implementations, the base station 102 can schedule the wireless resource to include a downlink interval, a guard time, and an uplink interval.

The base station 102, or a device controlling the base station 102, may be configured to dynamically select the guard time. The base station 102 may dynamically select the guard time based on a delay associated with the first UE 106. For example, the base station 102 may receive an indication of a device delay from the first UE 106. The device delay may be based, at least in part, on a processing time (also referred to as a "processing delay") of the first UE 106 and a switching time (also referred to as a "switching delay") of the first UE 106. In some implementations, the processing time and/or the switching time may depend on a packet size of the services being requested by the first UE 106. In particular implementations, the processing time and/or the switching time may depend on the type of services being requested by the first UE 106. For example, the UE first 106 may expect to spend a different time processing data associated with Ultra Reliable Low Latency Communication (URLLC) services than data associated with enhanced Mobile Broadband (eMBB) services. The base station may learn about the device delay associated with the first UE 106 from the first UE 106 itself. In some cases, the first UE 106 may transmit an indication of the device delay to the base station 102.

In some implementations, the base station 102 may be configured to determine a propagation delay associated with the first UE 106. In certain instances, the base station 102 can determine the propagation delay by calculating a Round Trip Time (RTT) associated with the first UE 106. The base station 102 may calculate the RTT by utilizing Timing Advance (TA) principles. For example, the base station 102 may transmit a radio signal to the first UE 106 that specifies a predetermined time period in which the UE 106 should transmit a preamble (or any other signal) to the base station 102. When the base station 102 receives the preamble from the first UE 106, the base station 102 can calculate the RTT by comparing the predetermined time period to the actual time period in which the base station 102 receives the preamble.

In some implementations, the base station 102 may be configured to select a Sub-Carrier Spacing (SCS) for the wireless resource based at least in part on the services being requested and/or various capabilities of the first UE 106. For example, if the services are latency-sensitive services (e.g., URLLC services), the base station 102 may select a relatively wide SCS that can accommodate a relatively large number of symbols in a relatively short amount of time. In some examples, the SCS can be selected based on a packet size of the services being requested. In some examples in which the UE is 5G-capable, the SCS may be calculated based on the following equation: $\Delta f = 2^{\mu} * 15$ kHz, where $\Delta f$ is a frequency interval of the wireless resource and $\mu$ is an integer. The SCS that is selected may determine a duration of a symbol within the wireless resource.

The base station 102 may select a guard time for the wireless resource based at least in part on the delay associated with the first UE 106 (e.g., the device delay, the propagation delay, and the like). In some instances, the base station 102 selects the guard time based at least in part on the SCS. For example, the base station may select the guard time to be greater than or equal to a sum of the device delay and the propagation delay. In some examples, the base station may select one or more symbols of a slot to represent the guard time. In some instances, the one or more symbols are a minimum number of symbols that exceeds the sum of the device delay and the propagation delay.

In various implementations, the base station 102 is configured to schedule the wireless resource to include a downlink interval, an uplink interval, and the guard time between the downlink interval and the uplink interval. The base station 102 may be further configured to transmit downlink data to the first UE 106 during the downlink interval and cause the first UE 106 to transmit uplink data from the first UE 106 during the uplink interval. The base station 102 may refrain from transmitting data during the scheduled guard time. The base station 102 may also cause the first UE 106 to refrain from transmitting data during the scheduled guard time. For example, the downlink data may include an indication instructing the first UE 106 to refrain from transmitting data during the scheduled guard time.

Figure 2:
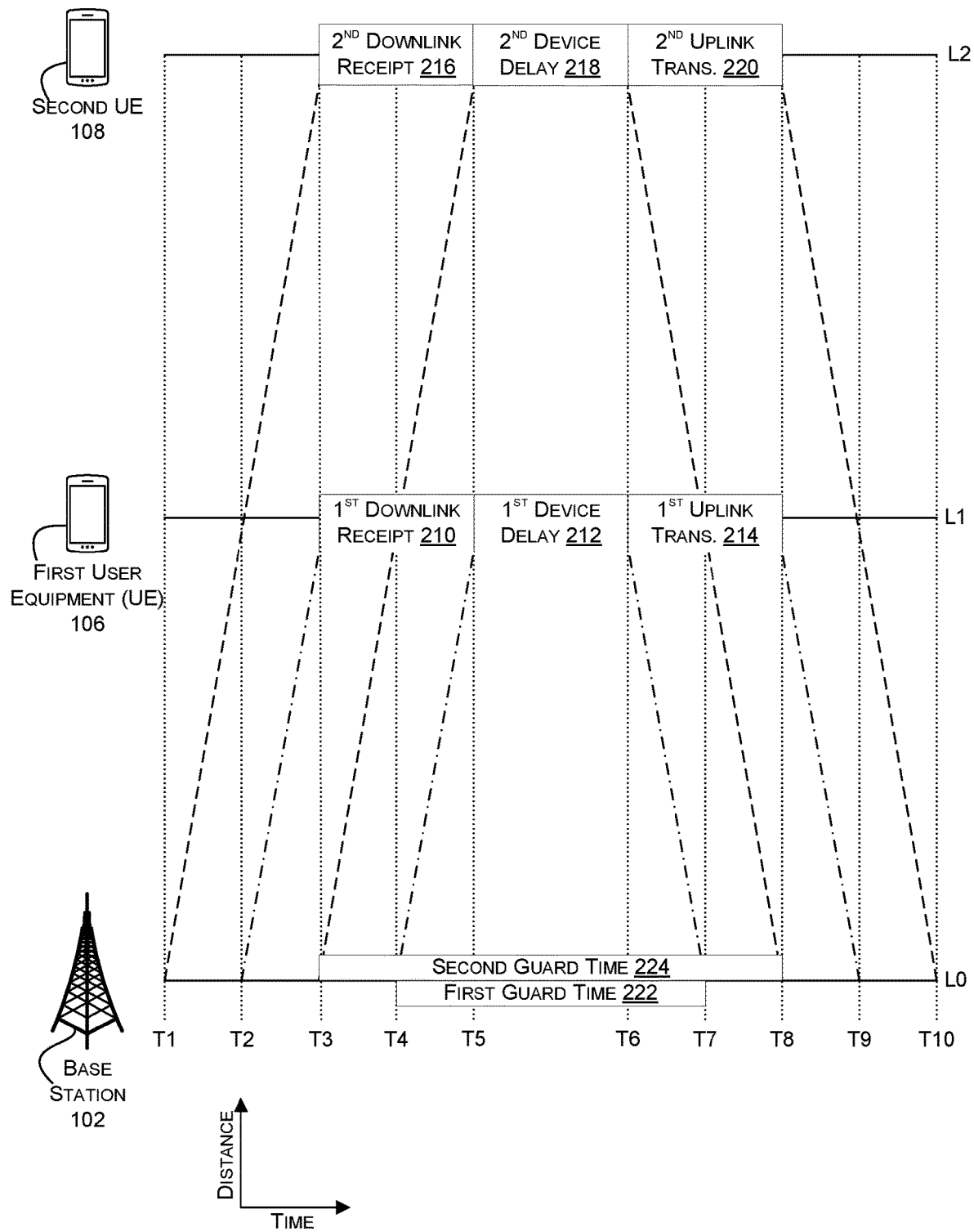
FIG. 2 is a diagram illustrating dynamic guard time selection according to implementations of the present disclosure.

FIG. 2 is a diagram illustrating dynamic guard time selection according to implementations of the present disclosure. In FIG. 2, time is defined in a horizontal direction and distance is defined in a vertical direction. Times T1 through T10 are defined in the horizontal direction, and locations L0 to L2 are defined in the vertical direction.

A base station 102 is configured to transmit and/or receive data wirelessly with a first User Equipment (UE) 106 and a second UE 108. The first UE 106 may be separated from the base station 102 by a first distance L0 to L1, and the second UE 108 may be separated from the base station 102 by a second distance L0 to L2. The first distance L0 to L1 may be shorter than the second distance L0 to L2. In some examples, the first distance L0 to L1 and the second distance L0 to L2 can be line-of-sight distances. In some instances, the first distance L0 to L1 and the second distance L0 to L2 can represent propagation distances, e.g., distances that a wireless signal has to travel between the base station 102 and the first and second UEs 106 and 108, respectively.

In some instances, the base station 102 may transmit downlink data to the first UE 106 during an interval from T2 to T4. However, due to the first distance L0 to L1, the first UE 106 may receive the downlink data during a different time interval than T2 to T4. As illustrated in FIG. 2, the first UE 106 receives the downlink data during a first downlink receipt interval 210 that is defined between T3 and T5.

Upon receiving the downlink data during the first downlink receipt interval 210, the first UE 106 may proceed with processing the downlink data and/or switching between receiving and transmitting functionalities during a first device delay 212. The first device delay 212 may include, for example, a processing time for the first UE 106 and a switching time for the first UE 106. In some instances, the first device delay 212 includes other delays associated with the first UE 106. The first device delay 212 can extend from T5 to T6.

Subsequently, the first UE 106 may transmit uplink data to the base station 102 during a first uplink transmission interval 214, which is defined between T6 and T8. The end of the first device delay 212 (i.e., T6) may be the earliest time the first UE 106 is configured to transmit uplink data. Although the first UE 106 can transmit the uplink data during the first uplink transmission interval 214, the base station may not receive the uplink data until an interval defined between T7 and T9, due to the first distance L0 to L1 between the base station 102 and the first UE 106.

In some implementations, a propagation delay associated with the first UE 106 includes a downlink propagation delay and an uplink propagation delay. A downlink propagation delay associated with the first UE 106 may be defined as the time interval between a time when the downlink data is transmitted by the base station 102 and a time when the downlink data is received by the first UE 106. As illustrated, the downlink propagation delay associated with the first UE 106 is equal to T3-T2, T5-T4, or a combination thereof. An uplink propagation delay associated with the first UE 106 may be defined as the time interval between a time when the uplink data is transmitted by the first UE 106 and a time when the uplink data is received by the base station 102. As illustrated, the uplink propagation delay associated with the first UE 106 is equal to T7-T6, T9-T8, or a combination thereof. In some instances, the propagation delay is a sum of the downlink propagation delay and the uplink propagation delay.

The base station 102 may select a first guard time 222 for transmissions between the base station 102 and the first UE 106. The first guard time 222 may extend from T4 to T7 and account for both the first device delay 212 as well as the propagation delay associated with the first UE 106. The first guard time 222 associated with the first UE 106 illustrated in FIG. 2 may represent a minimum amount of time scheduled between a downlink interval and an uplink interval to prevent the downlink and uplink data from occupying the same wireless resource at the same time. The first guard time 222 may be tailored specifically to the first device delay 212 and the propagation delay associated with the first UE 106. In some instances, a different guard time can be scheduled for other devices.

In some instances, the base station 102 may transmit downlink data to the second UE 108 during an interval from T1 to T3. However, due to the second distance L0 to L2, the second UE 108 may receive the downlink data during a different time interval than T1 to T3. As illustrated in FIG. 2, the second UE 108 receives the downlink data during a second downlink receipt interval 216 that is defined between T3 and T5.

Upon receiving the downlink data during the second downlink receipt interval 210, the second UE 108 may proceed with processing the downlink data and/or switching between receiving and transmitting functionalities during a second device delay 218. The second device delay 218 may include, for example, a processing time for the second UE 108 and a switching time for the second UE 108. In some instances, the second device delay 218 includes other delays associated with the second UE 106. The second device delay 218 can extend from T5 to T6.

Subsequently, the second UE 108 may transmit uplink data to the base station 102 during a second uplink transmission interval 214, which is defined between T6 and T8. The end of the second device delay 218 (i.e., T6) may be the earliest time the second UE 108 is configured to transmit uplink data. Although the second UE 106 transmits the uplink data during the second uplink transmission interval 220, the base station may not receive the uplink data until an interval defined between T8 and T10, due to the second distance L0 to L2 between the base station 102 and the second UE 108.

In some implementations, a propagation delay associated with the second UE 108 includes a downlink propagation delay and an uplink propagation delay. A downlink propagation delay associated with the second UE 108 may be defined as the time interval between a time when the downlink data is transmitted by the base station 102 and a time when the downlink data is received by the second UE 108. As illustrated, the downlink propagation delay associated with the first UE 106 is equal to T3-T1, T5-T3, or a combination thereof. An uplink propagation delay associated with the second UE 108 may be defined as the time interval between a time when the uplink data is transmitted by the second UE 108 and a time when the uplink data is received by the base station 102. As illustrated, the uplink propagation delay associated with the second UE 108 is equal to T8-T6, T10-T8, or a combination thereof. In some instances, the propagation delay is a sum of the downlink propagation delay and the uplink propagation delay.

The base station 102 may select a second guard time 224 for transmissions between the base station 102 and the second UE 108. The second guard time 224 may extend from T8 to T8 and account for both the second device delay 218 as well as the propagation delay associated with the second UE 108. The second guard time 224 associated with the second UE 108 illustrated in FIG. 2 represents a minimum amount of time scheduled between a downlink interval and an uplink interval to account for the device delay and to prevent the downlink and uplink data from occupying the same wireless resource at the same time. The second guard time 222 may be tailored specifically to the second device delay 218 and the propagation delay associated with the second UE 108.

Notably, the first device delay 212 and the second device delay 218 have the same time duration (e.g., T5 to T6) in FIG. 2. However, because the first distance L0 to L1 is shorter than the second distance L0 to L2, the first guard time 222 can be shorter than the second guard time 224. Accordingly, dynamically selecting the first guard time 222 for communications with the first UE 106 can increase spectrum efficiency and reduce latency.

Figure 3:
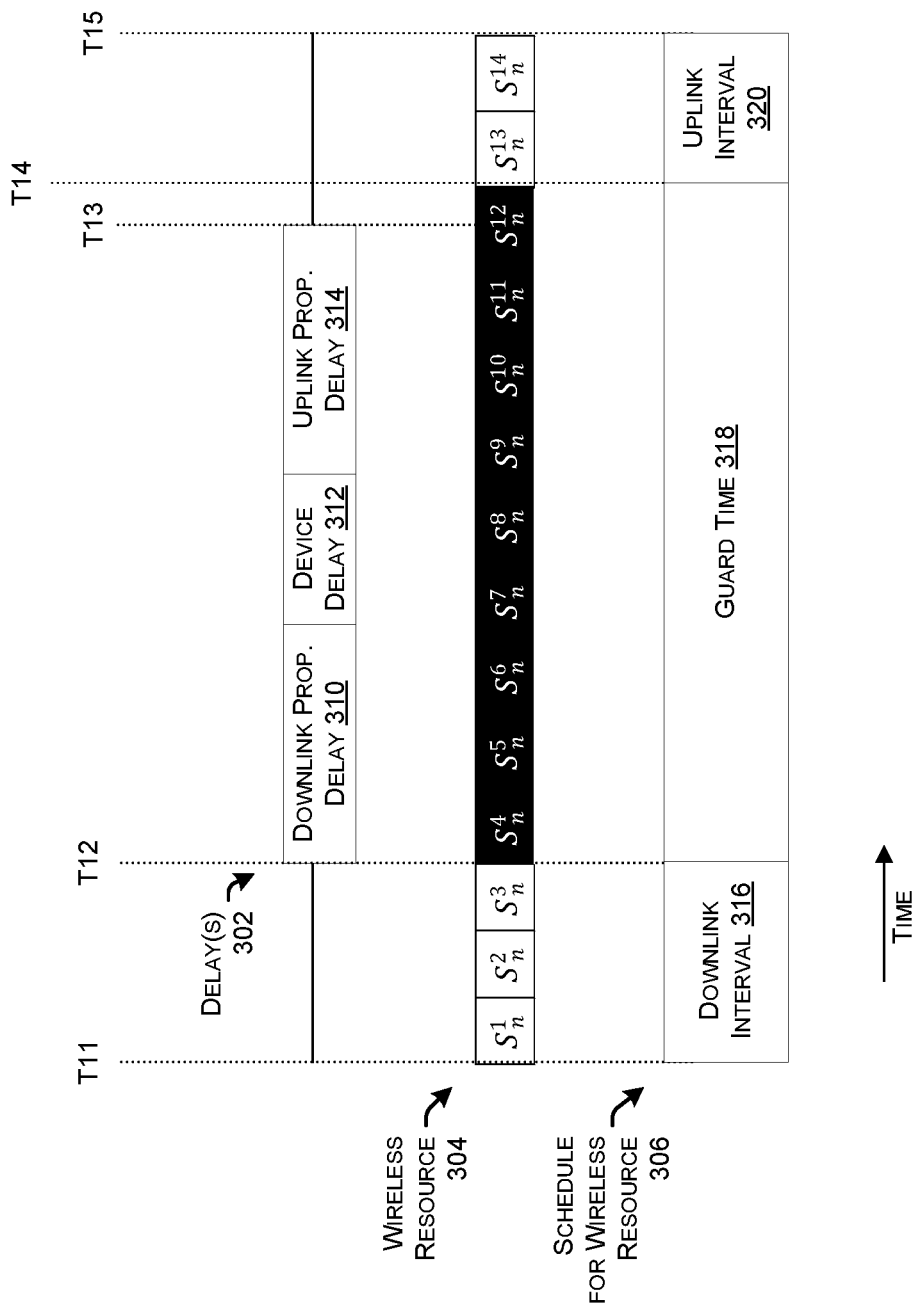
FIG. 3 illustrates an example of dynamically selecting a guard time based on a Sub-Carrier Spacing (SCS) according to implementations of the present disclosure.

FIG. 3 illustrates an example of dynamically selecting a guard time based on a Sub-Carrier Spacing (SCS) according to implementations of the present disclosure. In FIG. 3, time may be defined in a horizontal direction, such that times T11 through T15 are defined in the horizontal direction.

In various implementations, delay(s) 302 represent delay(s) associated with a particular device (e.g., a User Equipment (UE)). The delay(s) 302 can include a downlink propagation delay 310, a device delay 312, and an uplink propagation delay 314. The downlink propagation delay 310 can represent a time interval between a time in which downlink data is transmitted by one or more transceivers and a time in which the downlink data is received by the device. The device delay 312 may be a time interval that a device utilizes to process the downlink data and/or switch between a receiving functionality and a transmitting functionality. In some examples, the device delay 312 includes a processing time of the device and a switching time of the device. The uplink propagation delay 314 can represent a time interval between a time in which the uplink data is transmitted by the device and a time in which the uplink data is received by the one or more transceivers. In some instances, the one or more transceivers are part of a base station.

A wireless resource 304 may be scheduled based at least in part on the delay(s) 302. According to some examples, the wireless resource 304 is a slot including fourteen symbols $S_n^1$ to $S_n^{14}$. In some implementations, any of the symbols $S_n^1$ to $S_n^{14}$ is an Orthogonal Frequency Dimension Multiplexing (OFDM) symbol. Any of the symbols may have a specific time duration that depends on a Sub-Carrier Spacing (SCS) selected for the wireless resource 304. The SCS may be selected based on the type of services being requested by the device, network condition(s), and the like. Any of the symbols may be defined in a specific frequency interval. The frequency interval may depend on the SCS selected for the wireless resource, in some cases.

In some implementations, a guard time 318 may be scheduled for an integer number of symbols in a schedule for the wireless resource 306. However, in some instances, a total duration of the delay(s) 302 may not perfectly match an integer number of the symbols $S_n^1$ to $S_n^{14}$. For example, the delay(s) may extend from T12 to T13, where T13 is during a twelfth symbol $S_n^{12}$ of the wireless resource 304. In some cases, the guard time 318 may include the delay(s) 302 rounded up to the nearest symbol. That is, the guard time 318 may extend from T12 to T14 and may include the fourth through twelfth symbols $S_n^4$ to $S_n^{12}$ of the wireless resource 304. In some implementations, the guard time 318 may be no more than one symbol longer in duration than the delay(s) 302.

The guard time 318 may be scheduled between a downlink interval 316 and an uplink interval 320. The downlink interval 316 may include one or more symbols reserved for the transmission of downlink data via the wireless resource 304. For example, the downlink interval 316 may extend from T11 to T12 and include first through third symbols $S_n^1$ to $S_n^3$ of the wireless resource 304. The uplink interval 320 may include one or more symbols reserved for the transmission of uplink data via the wireless resource 304. For example, the uplink interval 320 may extend from T14 to T15 and include thirteenth and fourteenth symbols $S_n^{13}$ to $S_n^{14}$.

In various implementations, the delay(s) 302 can have different durations. For example, if the device moves closer or farther to the base station, the downlink propagation delay 310 and the uplink propagation delay 314 (also referred to collectively as a "propagation delay") can change accordingly. In some examples, a different device, or the same device operating under a different condition, can have a different device delay. In various implementations, the guard time 318 can be dynamically selected in one or more symbols of the wireless resource 304 based on the delay(s) 302. Implementations of the delay(s) 302, the wireless resource 304, and the schedule for the wireless resource 306 are not limited to the specific times and symbols illustrated in FIG. 3.

Figure 4:
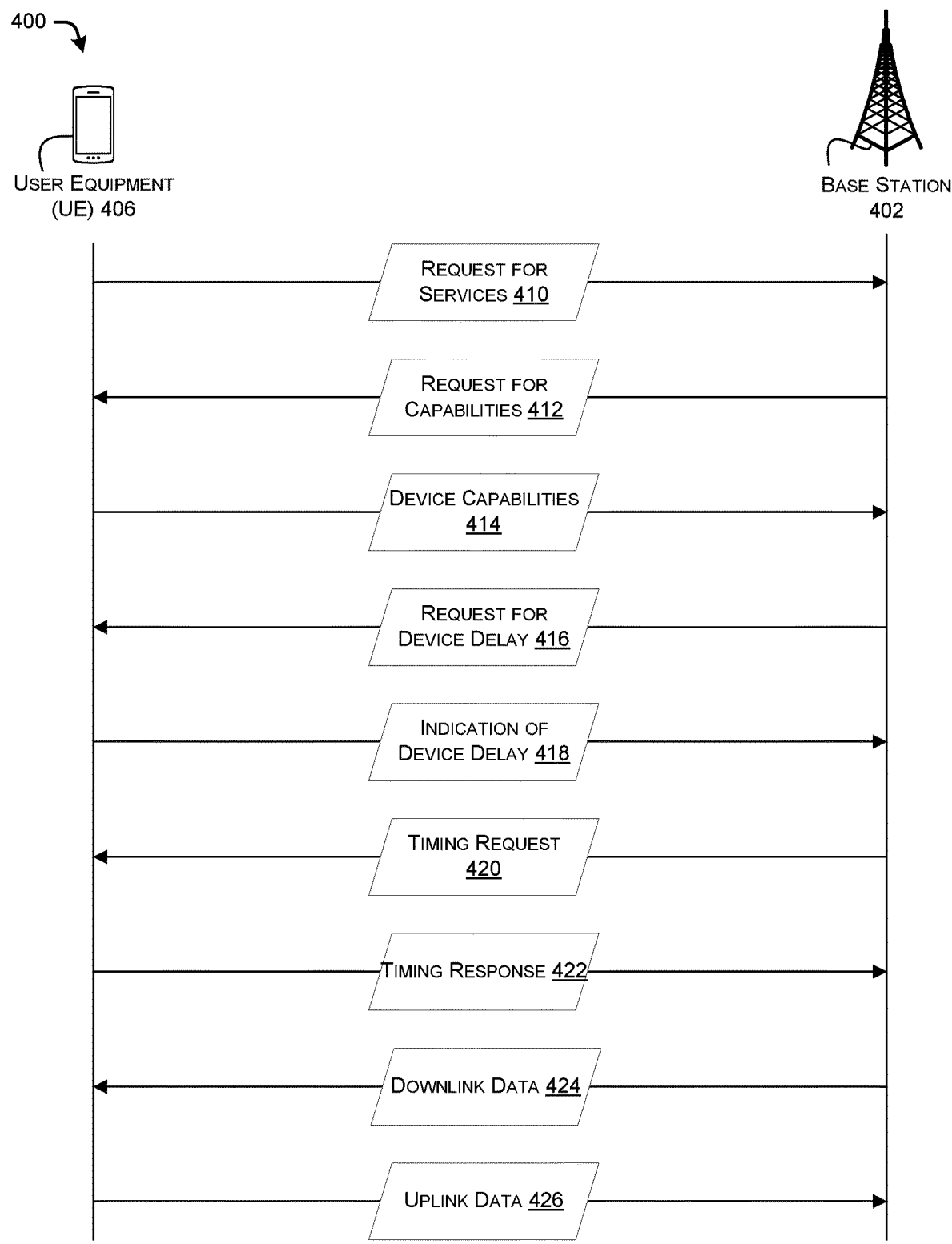
FIG. 4 illustrates signaling between a base station and a User Equipment (UE) performing dynamic guard time selection according to implementations of the present disclosure.

FIG. 4 illustrates signaling 400 between a base station 402 and a User Equipment (UE) 406 performing dynamic guard time selection according to implementations of the present disclosure.

The UE 406 may transmit a request for services 410 to the base station 402. The request for services 410 may specify a type of services being requested. For example, the request for services 410 may be a request for any of voice services, data services, latency-sensitive services, Internet browsing services, and the like. In some implementations, the type of services being requested is a type of 5G-specific services, such as any of Ultra-Reliable Low Latency Communication (URLLC) services, enhanced Mobile Broadband (eMBB) services, Massive Machine Type Communications (mMTC) services, and the like. The request for services 410 may be a request for a communication session between the UE 406 and another device, wherein the base station 402 may relay communication between the UE 406 and the other device.

In particular implementations, the request for services 410 can be omitted from the signaling 400. In some cases, the services are initiated by a third party. In certain implementations, a request to deliver services to the UE 406 is received from the third party. For example, a device (e.g., a media server) may transmit, to the base station 402, a request to deliver a push notification to the UE 406, a request to setup a voice call originating from another UE with the UE 406, or the like.

The base station 402 may transmit a request for capabilities 412 to the UE 406. In response to receiving the request for capabilities 412, the UE 406 may transmit an indication of device capabilities 414 to the base station 402. The indication of the device capabilities 414 may include, for example, an indication that the UE 406 is at least one of 5G-capable, 4G-capable, capable of utilizing wireless resources in a specific frequency range, and the like.

In some implementations, the base station 402 may select a wireless resource based at least in part on the request for services 410 and/or the indication of capabilities 414. For example, if the request for services 410 indicate 5G-specific services, and/or if the indication of capabilities 414 indicates that the UE 406 is 5G-capable, the wireless resource may be a 5G New Radio (NR) wireless resource. In a case where the request for services 410 indicate 4G-specific services, and/or if the indication of capabilities 414 indicates that the UE 406 is 4G-capable, the wireless resource may be a type of 4G wireless resource. In various implementations, the wireless resource could be a frame, a sub-frame, a slot, a Physical Resource Block (PRB), a channel, or a combination thereof.

In some implementations, the base station 402 may also select a Sub-Carrier Spacing (SCS) for the wireless resource. In cases in which the wireless resource includes one or more symbols, the SCS that is selected may impact a duration of the one or more symbols in the wireless resource. The SCS may be selected, in some cases, based on the type of services requested by the UE 406. For example, the SCS may be based at least in part on a type of latency requirement of the services. The SCS may be selected, in certain cases, based on network conditions. In certain cases, the SCS may be fixed regardless of the type of services, latency requirement, or network conditions. In certain implementations, for certain 4G Long Term Evolution (LTE) wireless resources, the SCS is fixed at 15 kHz, and the duration of each symbol in the wireless resources is 66.67 microseconds. In some implementations, for certain 5G NR wireless resources, the SCS can be 15 kHz and the duration of each symbol can be 66.67 microseconds; the SCS can be 30 kHz and the duration of each symbol can be 33.33 microseconds; the SCS can be 60 kHz and the duration of each symbol can be 16.67 microseconds; the SCS can be 120 kHz and the duration of each symbol can be 8.33 microseconds; the SCS can be 240 kHz and the duration of each symbol can be 4.17 microseconds; or the like. A 5G NR slot may contain 7 or 14 symbols. The following Table 1 illustrates various examples of SCSs, where $\mu$ is an integer.

TABLE 1

| SCS | 15 kHz | 30 kHz | 60 kHz | $2^\mu$ * 15 kHz |
|---|---|---|---|---|
| OFDM Symbol Duration | 66.67 μs | 33.33 μs | 16.67 μs | $66.67/2^\mu$ μs |
| Cyclic Prefix (CP) Duration | 4.69 μs | 2.34 μs | 1.17 μs | $4.69/2^\mu$ μs |
| OFDM Symbol Including Cyclic-Prefix (CP) | 71.35 μs | 35.68 μs | 17.84 μs | $71.35/2^\mu$ μs |
| Number of OFDM Symbols Per Slot | 7 or 14 | 7 or 14 | 7 or 14 | 14 |
| Slot Duration | 500 μs or 1,000 μs | 250 μs or 500 μs | 125 μs or 250 μs | $1,000/2^\mu$ μs |

The base station 402 may transmit a request for a device delay 416 to the UE 406. In response to receiving the request for the device delay 416, the UE 406 may transmit an indication of the device delay 418. In some cases, the UE 406 may calculate the device delay based on a variety of factors.

In some implementations in which the UE 406 determines the processing time, the base station 402, and the corresponding network, must also be able to support the service associated with the time. In certain cases in which the UE 406 attempts to use a non-supported processing time, the base station 402 or network may prevent that service from being utilized or request the UE 406 to adjust the processing time.

In some implementations, the UE 406 may track a previous time for processing data, predict a future time for processing data, or a combination thereof, and may calculate the device delay based at least in part on the previous time, the future time, and/or the like. The processing time can be based at least in part on a data packet size of the services requested by the UE 406. For example, a type of services with a relatively large packet size (e.g., data used to control a remote surgery apparatus in real time) may require a longer processing time on the part of the UE 406 than a type of services with a relatively small packet size (e.g., augmented reality data). In some instances, the processing time can be based at least in part on the type of services being requested. For example, the UE 406 may determine a first processing time for data associated with URLLC services, and a second processing time for data associated with eMBB services, where the first processing time and the second processing time have different durations. In some cases, the first processing time may be shorter than the second processing time. In particular implementations, the processing time can be based at least in part on a chipset computing capability of the UE 406. For example, a processing time associated with the UE 406 may be longer than a processing time associated with a higher-end UE having a higher processing capability. In certain cases, the base station 402 may be able to at least partially derive the processing time by identifying the manufacturer and/or chipset computing capability of the UE 406.

In some cases, the UE 406 may track a previous time for switching between receiving and transmitting functionalities, predict a future time for switching between receiving and transmitting functionalities, or a combination thereof, and may calculate the device delay based at least in part on the previous time, the future time, and/or the like. In some implementations, a time for the UE 406 to switch between receiving and transmitting functionalities is a "switching time." The UE 406 may calculate or predict the switching time by determining a time that it takes one or more transceivers associated with the UE 406 to switch between receiving downlink data and transmitting uplink data, for example.

The base station 402 may transmit an timing request 420 to the UE 406. In response, the UE 406 may transmit an timing response 422 to the UE 406. The timing request 420 may indicate a specific time period in which the UE 406 is requested to transmit the timing response 422. In some cases, the timing response 422 includes a preamble of a signal transmitted from the UE 406 to the base station 402.

Based at least in part on the timing response 422, the base station 402 may determine a propagation delay associated with the UE 406. For example, the base station 402 may calculate a Round Trip Time (RTT) based on the timing response 422. In particular implementations, the base station 402 may compare a time at which the timing response 422 is received by the base station 402 to the specific time period specified by the timing request 420. A temporal discrepancy between the timing request 420 and the timing response 422 may correspond to an end-to-end delay between the base station 402 and the UE 406.

The base station 402 may determine a guard time based on various information determined throughout the signaling 400. In various implementations, the base station 402 can determine the guard time based at least in part on any of the SCS, the device delay 416, the processing time, the switching time, and the propagation delay. In some implementations, the guard time is greater than or equal to a first sum of the device delay and the propagation delay. In certain implementations, the guard time is less than or equal to a second sum of the first sum and a duration of one of the symbols in the wireless resource. In some examples, the guard time may be equal to the duration of an integer number of one or more symbols in the wireless resource. The guard time may correspond to a minimum number of symbols in the wireless resource that accommodates the first sum of the device delay and the propagation delay, in some cases.

The base station 402 may schedule the guard time in the wireless resource. In various implementations, the base station 402 may schedule the wireless resource to include a downlink interval, an uplink interval, and the guard time between the downlink interval and the uplink interval.

The base station 402 may subsequently transmit and/or receive data based on the scheduled wireless resource. The base station 402 may transmit downlink data 424 to the UE 406 according to the scheduled wireless resource. For example, the base station 402 may transmit the downlink data 424 via the wireless resource during the downlink interval. In various implementations, the base station 402 may refrain from transmitting the downlink data 424 during the guard time. In some instances, the downlink data 424 can include an indication of the guard time and/or the uplink interval. In certain implementations, the base station 402 may cause the UE 406 to transmit uplink data 426 during the scheduled uplink interval by transmitting the indication of the guard time and/or the uplink interval to the UE 406. In particular implementations, the UE 406 can infer the guard time and/or the uplink interval based on the downlink data 424, by performing processing of the downlink data 424 and switching between receiving and transmitting functionalities immediately after receiving the last of the downlink data 424.

The UE 406 may transmit the uplink data 426 to the base station 402 during the uplink interval. In some cases, the UE 406 may learn about the uplink interval from the base station 402 via the downlink data 424, or some other transmission between the base station 402 and the UE 406. In certain implementations, the UE 406 initiates processing of the downlink data 424 and switching from a receiving functionality to a transmitting functionality upon receiving the downlink data 424 and then transmits the uplink data 426 immediately after the processing and switching processes are complete. In various implementations, the UE 406 may refrain from transmitting the uplink data 426 during the guard time.

Although the signaling 400 has been described as including various transmissions 410 to 426 between the base station 402 and the UE 406, any one of the transmissions 410 to 426 can be omitted, combined with one or more others of the transmissions 410 to 426, separated into multiple different transmissions, and the like. Any one of the transmissions 410 to 426 within the signaling 400 can be in the form of one or more data packets transmitted over one or more wireless links between the base station 402 and the UE 406, in particular implementations.

Figure 5:
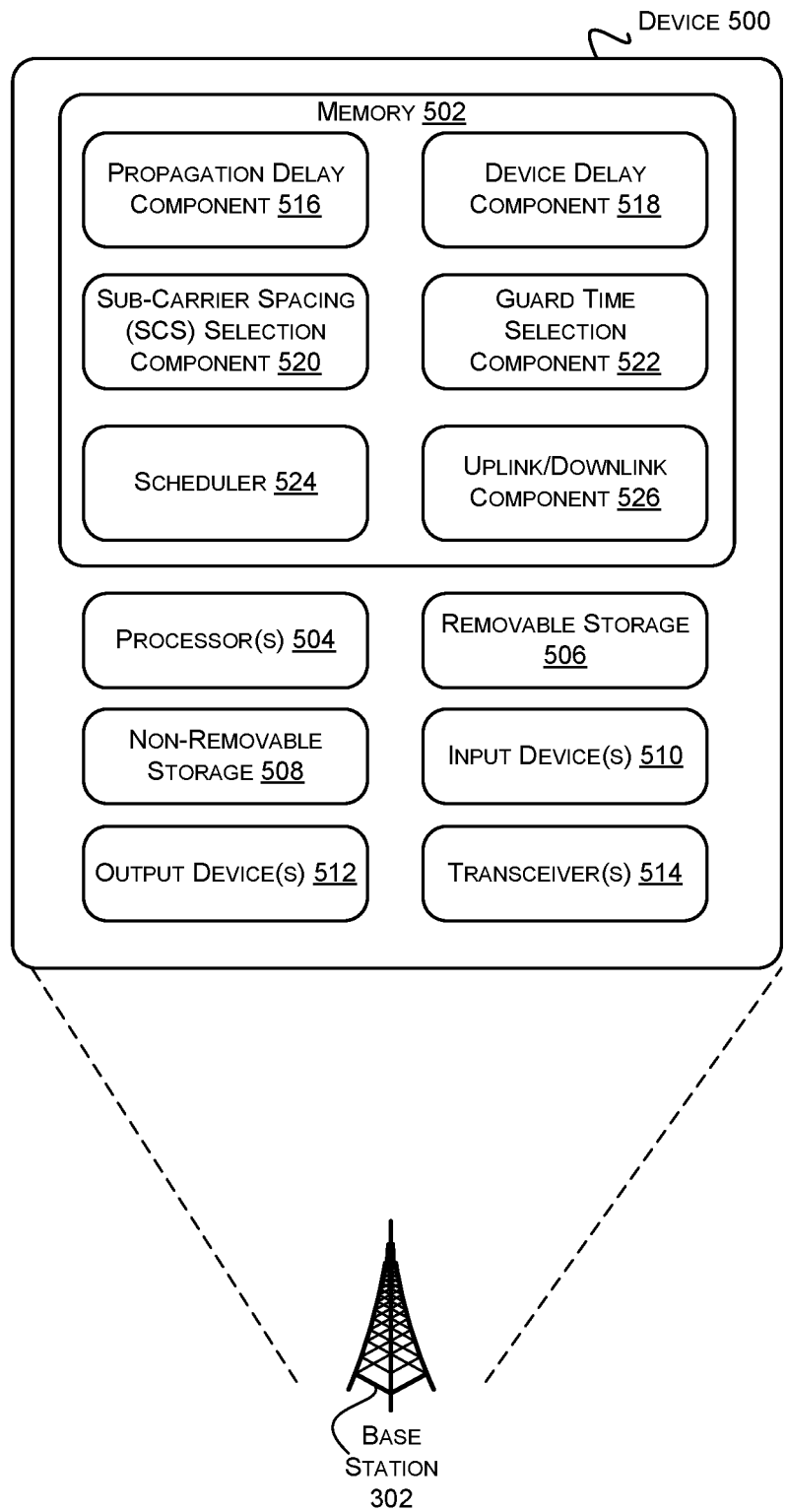
FIG. 5 illustrates a device configured to perform dynamic guard time selection according to implementations of the present disclosure.

FIG. 5 illustrates a device 500 configured to perform dynamic guard time selection according to implementations of the present disclosure. In some implementations, the device 500 is the base station 302. In certain cases, any of the components of the device 500 can comprise a controller of the base station 302 and can be separate from the base station 302.

The device 500 may include a memory 502, processor(s) 504, removable storage 506, non-removable storage 508, input device(s) 510, output device(s) 512, and transceiver(s) 514.

The memory 502 may include a propagation delay component 516, a device delay component 518, a Sub-Carrier Spacing (SCS) selection component 520, a guard time selection component 522, a scheduler 524, and an uplink/downlink component 526.

The propagation delay component 516 may include instructions for determining a propagation delay associated with another device that may be in communication with the device 500 (e.g., UE 406). In some implementations, the propagation delay includes a downlink propagation delay and an uplink propagation delay associated with the other device. In particular implementations, the propagation delay component 516 may include instructions for generating an timing request (e.g., timing request 420), causing the transceiver(s) 514 to transmit the timing request, causing the other device to transmit an timing response (e.g., timing response 422) to the transceiver(s) 514, and calculating the propagation delay based at least in part on the timing request and/or the timing response.

The device delay component 518 may include instructions for determining a device delay associated with the other device in communication with the device 500. In some implementations, the device delay includes a processing time and a switching time associated with the other device. In particular implementations, the device delay component 518 may include instructions for generating a request for the device delay (e.g., request for device delay 416), causing the transceiver(s) 514 to transmit the request for the device delay, causing the other device to transmit an indication of the device delay (e.g., indication of device delay 418) to the transceiver(s) 514, and determining the device delay based at least in part on the indication of the device delay.

The SCS selection component 520 may include instructions for selecting an SCS for a wireless resource. In some implementations, the wireless resource includes a slot. In particular implementations, the SCS selection component 520 may include instructions for generating a request for capabilities (e.g., request for capabilities 412), causing the transceiver(s) 514 to transmit the request for capabilities to the other device, causing the device to transmit an indication of device capabilities (e.g., device capabilities 414) to the transceiver(s) 514, and selecting the SCS for the wireless resource based at least in part on the indication of device capabilities and/or a request for services (e.g., request for services 410) received from the other device. The SCS may be selected based on the following equation: $\Delta f = 2^\mu * 15$ kHz, where $\Delta f$ is a frequency interval of the wireless resource (e.g., a SCS) and $\mu$ is an integer. The SCS that is selected may determine a duration of a symbol within the wireless resource. In some implementations, any of the instructions included in the SCS selection component 520 may be triggered in response to the transceiver(s) 514 receiving a request for services from the other device.

The scheduler 524 may include instructions for scheduling the wireless resource. In particular implementations, the scheduler 524 can include instructions for scheduling a downlink interval in the wireless resource, scheduling an uplink interval in the wireless resource, determining a guard time, and scheduling the guard time, in the wireless resource, to be between the downlink interval and the uplink interval. The guard time may be determined based at least in part on any of the device delay, the propagation delay, and the SCS. In some examples, the guard time is greater than or equal to a sum of the device delay and the propagation delay. In some examples, the guard time is less than or equal to a sum of the device delay, the propagation delay, and the duration of one symbol in the wireless resource. In particular implementations, a duration of the guard time is the duration of an integer number of symbols in the wireless resource.

The uplink/downlink component 526 may include instructions for causing transmission of downlink data (e.g., downlink data 424) and for causing the transmission of uplink data (e.g., uplink data 426) to the device 500. In some implementations, the uplink/downlink component 526 includes instructions for causing transmission of the downlink data from the transceiver(s) 514 to the other device during the scheduled downlink interval. In certain implementations, the uplink/downlink component 526 includes instructions for causing transmission of the uplink data from the other device to the transceiver(s) 514) during the scheduled uplink interval.

In some implementations, memory 502 can be volatile (such as RAM), non-volatile (such as ROM, flash memory, etc.) or some combination of the two. Further, the device 500 may also include additional data storage devices (removable and/or non-removable) such as, for example, magnetic disks, optical disks, or tape. Such additional storage is illustrated by, for example, removable storage 506 and/or non-removable storage 508. Tangible computer-readable media can include volatile and non-volatile, removable and non-removable media implemented in any method or technology for storage of information, such as computer readable instructions, data structures, program modules, or other data. Any of the memory 502, removable storage 506, and non-removable storage 508 can be examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information. Any such tangible computer-readable media can be part of the device 500.

In some implementations, processor(s) 504 include a central processing unit (CPU), a graphics processing unit (GPU), or both CPU and GPU, or other processing unit or component known in the art. Processor(s) 504 may be configured to execute component(s) stored in the memory 502, removable storage 506, and/or the non-removable storage 508. For example, processor(s) 504 may be configured to execute any of the propagation delay component 516, the device delay component 518, the SCS selection component 520, the guard time selection component 522, the scheduler 524, and the uplink/downlink component 526.

In some implementations, the input device(s) 510 are configured to receive inputs from a device and/or a user. The input device(s) 510 can include any of a keypad, a cursor control, a touch-sensitive display, voice input device, etc. In various implementations, the output device(s) 512 are configured to output data to a device and/or a user. The output device(s) 512 can include any of a display, speakers, printers, etc. These devices are well known in the art and need not be discussed at length here.

In some implementations, transceiver(s) 514 can be configured to transmit and/or receive data. In particular implementations, transceiver(s) 514 include a network interface card (NIC), a network adapter, a LAN adapter, or a physical, virtual, or logical address to connect to various networks, devices, or components. To increase throughput when exchanging wireless data, the transceiver(s) 514 can utilize multiple-input/multiple-output (MIMO) technology. The transceiver(s) 514 can comprise any sort of wireless receivers, transmitters, and/or transceivers capable of engaging in wireless, radio frequency (RF) communication. Transceiver(s) 514 can also include other wireless modems, such as a modem for engaging in Wi-Fi, WiMAX, Bluetooth, infrared communication, and the like.

Figure 6:
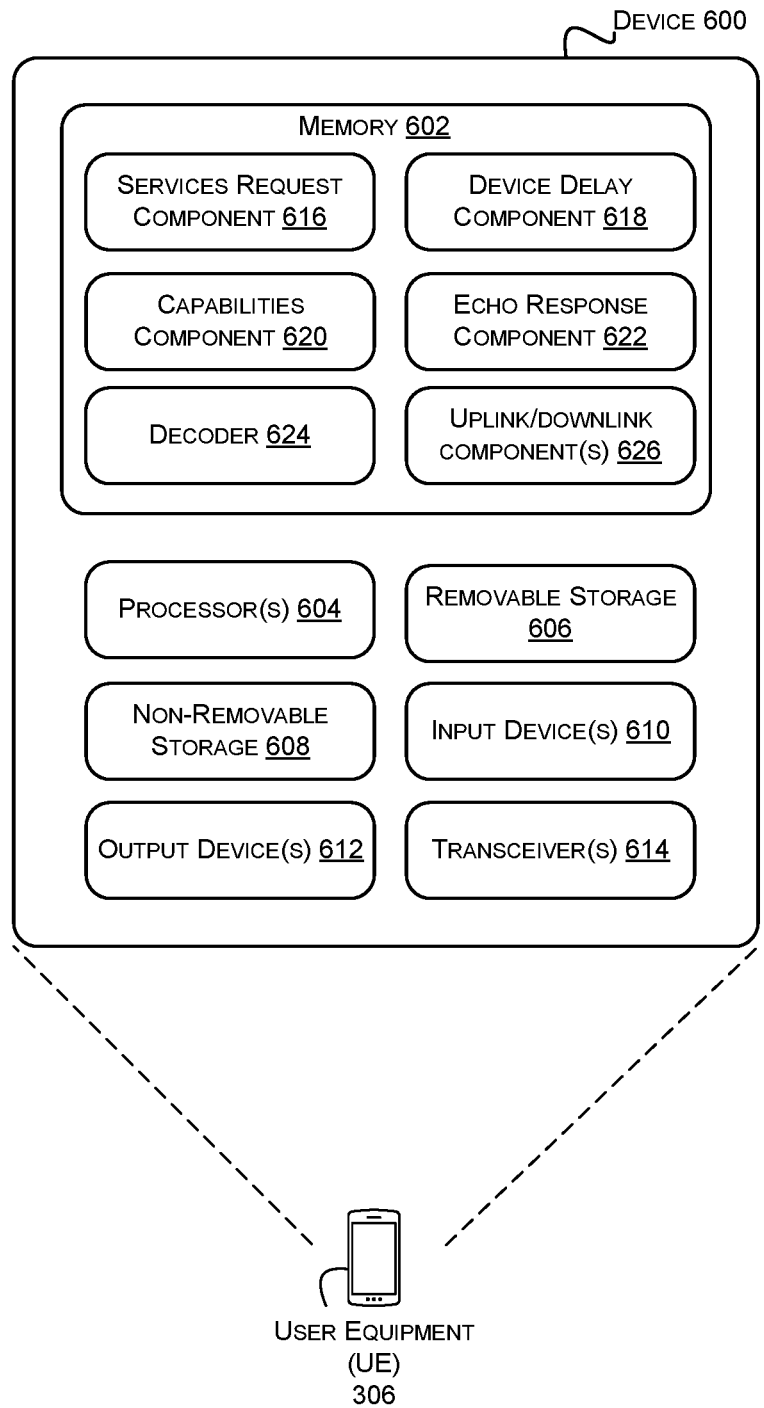
FIG. 6 illustrates a device according to implementations of the present disclosure.

FIG. 6 illustrates a device 600 according to implementations of the present disclosure. In some implementations, the device 600 is the User Equipment (UE) 306.

The device 600 may include a memory 602, processor(s) 604, removable storage 606, non-removable storage 608, input device(s) 610, output device(s) 612, and transceiver(s) 614.

The memory 602 may include a services request component 616, a device delay component 618, a capabilities component 620, an timing response component 622, a decoder 624, and uplink/downlink component(s) 626.

The services request component 616 may include instructions for requesting services from a base station (e.g., base station 402). In particular implementations, the services request component 616 may include instructions for generating a request for services (e.g., request for services 410) and causing the transceiver(s) 614 to transmit the request for services to the base station.

The device delay component 618 may include instructions for reporting an indication of a device delay associated with the device 600 to the base station. In particular implementations, the device delay component 618 may include instructions for determining a device delay associated with the device 600, generating an indication of the device delay (e.g., indication of device delay 418), and causing the transceiver(s) 614 to transmit the indication of the device delay to the base station. In some implementations, any of the instructions included in the device delay component 618 may triggered in response to the transceiver(s) 614 receiving a request for the device delay (e.g., request for device delay 416) from the base station.

The capabilities component 620 may include instructions for reporting one or more capabilities of the device 600 to the base station. In particular implementations, the capabilities component 620 may include instructions for generating an indication of device capabilities (e.g., indication of device capabilities 414) and causing the transceiver(s) 614 to transmit the indication of the device capabilities to the base station. In some implementations, any of the instructions included in the capabilities component 620 may be triggered in response to the transceiver(s) 614 receiving a request for capabilities (e.g., request for capabilities 412) from the base station.

The timing response component 622 may include instructions for generating an timing response (e.g., timing response 422) and transmitting the timing response to the base station. In some implementations, any of the instructions included in the timing response component 622 may be triggered in response to the transceiver(s) 614 receiving an timing request (e.g., timing request 420) from the base station.

The decoder 624 may include instructions for decoding data (e.g., downlink data 424) that has been received by the transceiver(s) 614. In some implementations, the decoder 624 includes instructions for performing error correction and/or error detection on the data.

The uplink/downlink component(s) 626 may include instructions for causing the transceiver(s) 614 to receive data (e.g., downlink data 424) from the base station, generating data (e.g., uplink data 426), and causing the transceiver(s) 614 to transmit data (e.g., uplink data 426) to the base station. In some implementations, any of the instructions included in the uplink/downlink component(s) 626 may be triggered in response to the transceiver(s) 614 receiving downlink (e.g., downlink data 424) from the base station.

In some implementations, memory 602 can be volatile (such as RAM), non-volatile (such as ROM, flash memory, etc.) or some combination of the two. Further, the device 600 may also include additional data storage devices (removable and/or non-removable) such as, for example, magnetic disks, optical disks, or tape. Such additional storage is illustrated by, for example, removable storage 606 and/or non-removable storage 608. Tangible computer-readable media can include volatile and non-volatile, removable and non-removable media implemented in any method or technology for storage of information, such as computer readable instructions, data structures, program modules, or other data. Any of the memory 602, removable storage 606, and non-removable storage 608 can be examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information. Any such tangible computer-readable media can be part of the device 600.

In some implementations, processor(s) 604 include a central processing unit (CPU), a graphics processing unit (GPU), or both CPU and GPU, or other processing unit or component known in the art. Processor(s) 604 may be configured to execute component(s) stored in the memory 602, removable storage 606, and/or the non-removable storage 608. For example, processor(s) 604 may be configured to execute any of the services request component 616, the device delay component 618, the capabilities component 620, the timing response component 622, the decoder 624, and the uplink/downlink component(s) 626.

In some implementations, the input device(s) 610 are configured to receive inputs from a device and/or a user. The input device(s) 610 can include any of a keypad, a cursor control, a touch-sensitive display, voice input device, etc. In various implementations, the output device(s) 612 are configured to output data to a device and/or a user. The output device(s) 612 can include any of a display, speakers, printers, etc. These devices are well known in the art and need not be discussed at length here.

In some implementations, transceiver(s) 614 can be configured to transmit and/or receive data. In particular implementations, transceiver(s) 614 include a network interface card (NIC), a network adapter, a LAN adapter, or a physical, virtual, or logical address to connect to various networks, devices, or components. To increase throughput when exchanging wireless data, the transceiver(s) 614 can utilize multiple-input/multiple-output (MIMO) technology. The transceiver(s) 614 can comprise any sort of wireless receivers, transmitters, and/or transceivers capable of engaging in wireless, radio frequency (RF) communication. Transceiver(s) 614 can also include other wireless modems, such as a modem for engaging in Wi-Fi, WiMAX, Bluetooth, infrared communication, and the like.

Figure 7:
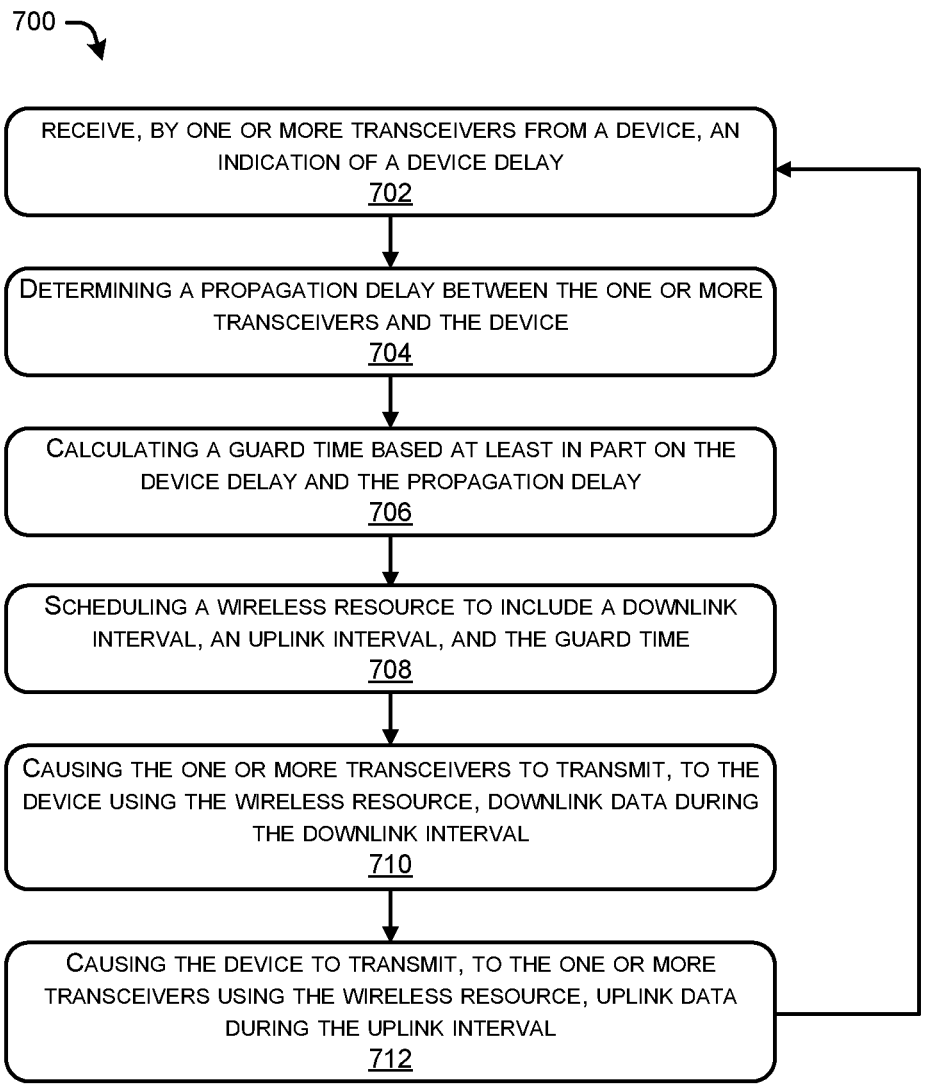
FIG. 7 illustrates a process for dynamically selecting a guard time according to implementations of the present disclosure.
Figure 8:
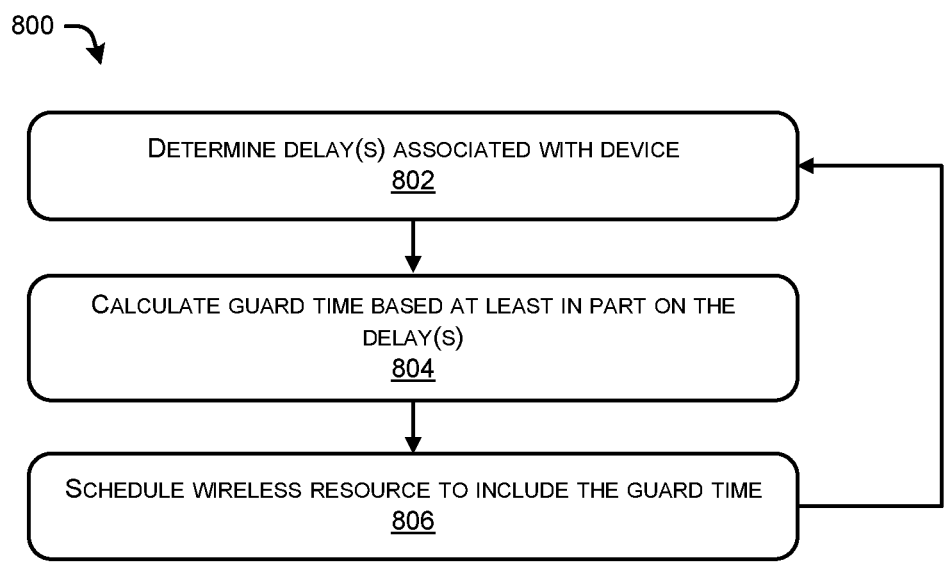
FIG. 8 illustrates a process for dynamically selecting a guard time according to implementations of the present disclosure.
Figure 9:
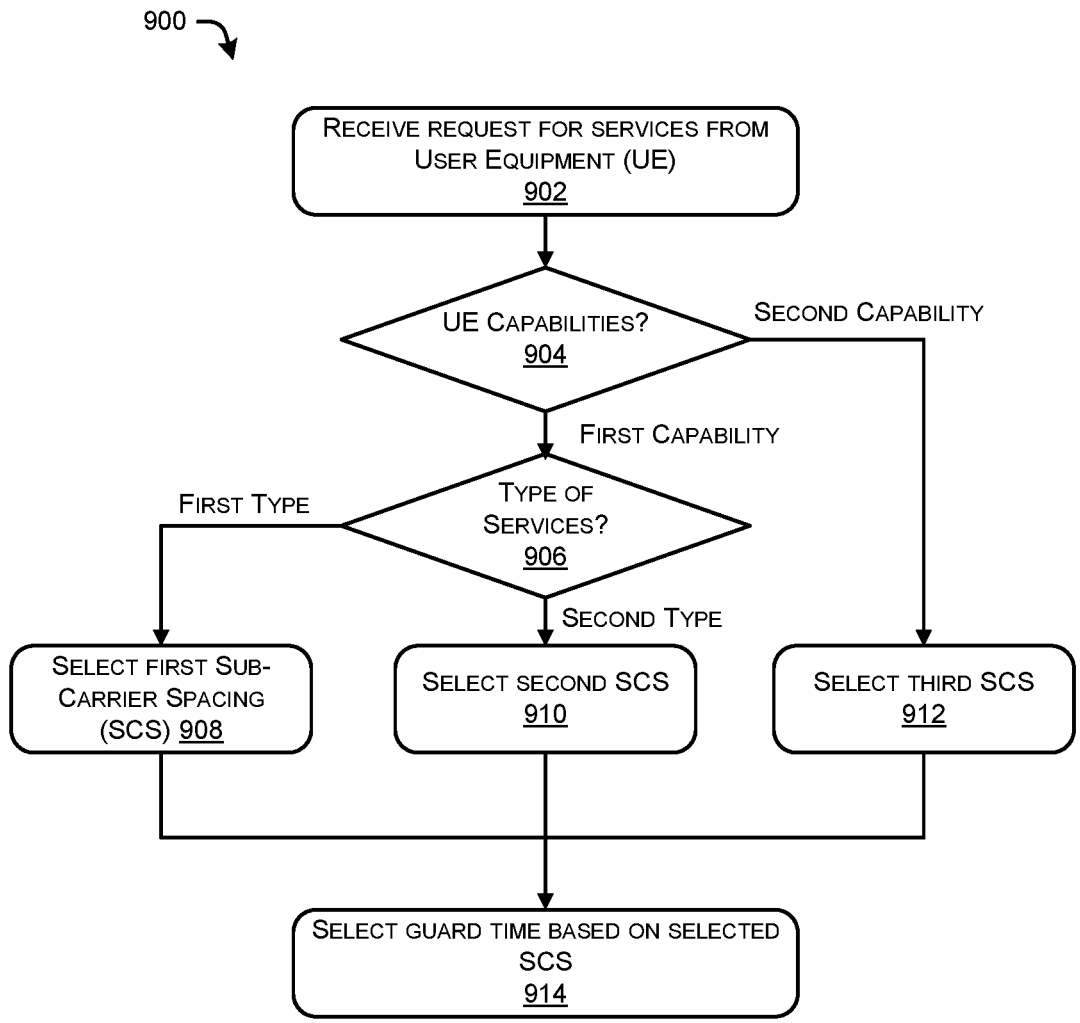
FIG. 9 illustrates a process for dynamically selecting a guard time based at least in part on a selected SCS according to implementations of the present disclosure.

FIGS. 7 to 9 illustrate example processes in accordance with implementations of the present disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel, and can be performed multiple times, to implement the processes.

FIG. 7 illustrates a process 700 for dynamically selecting a guard time according to various implementations. In some implementations, process 700 is performed by a base station, or by a system controlling a base station.

At 702, one or more transceivers may receive an indication of a device delay from a device (e.g., indication of device delay 418). The device may determine and self-report the device delay. The device delay can account for various delays associated with the device, such as a processing time and a switching time.

At 704, a propagation delay between the one or more transceivers and the device can be determined. In certain implementations, the propagation delay can be determined by pinging the device. For example, an timing request (e.g., timing request 420) can be transmitted to the device, an timing response (e.g., timing response 422) can be received from the device, and the propagation delay can be derived from the timing request and/or the timing response. The propagation delay may include a downlink propagation delay and an uplink propagation delay, in some cases.

A guard time can be calculated based at least in part on the device delay and the propagation delay at 706. In some cases, the guard time may be greater than or equal to a sum of the device delay and the propagation delay. In certain implementations, the guard time may be calculated based at least in part on a Sub-Carrier Spacing (SCS) selected for a wireless resource. In some implementations, the guard time may be equal to the duration of an integer number of symbols in the wireless resource. For example, the guard time may include a time duration equal to the sum of the device delay and the propagation delay rounded up to the nearest symbol.

At 708, the wireless resource can be scheduled to include a downlink interval, an uplink interval, and the guard time. In various implementations, the guard time is scheduled between the downlink interval and the uplink interval. For example, the guard time is scheduled at a time interval after the downlink interval and before the uplink interval. Each one of the downlink interval and the uplink interval may include an integer number of symbols of the wireless resource, in some cases. In some implementations, the guard time may be shorter than or equal to a sum of the device delay, the propagation delay, and a duration of one of the symbols in the wireless resource.

At 710, the process 700 can include causing the one or more transceivers to transmit, to the device using the wireless resource, downlink data during the downlink interval. In various implementations, the downlink data can be transmitted in one or more symbols of the wireless resource.

At 712, the process 700 can include causing the device to transmit, to the one or more transceivers using the wireless resource, uplink data during the uplink interval. In various implementations, the uplink data can be transmitted in one or more symbols of the wireless resource.

FIG. 8 illustrates a process 800 for dynamically selecting a guard time according to various implementations of the present disclosure. In some implementations, process 800 can be performed by a base station, a device controlling a base station, or a combination thereof.

At 802, delay(s) associated with a device are determined. The delay(s) may include any of a device delay, a propagation delay, and the like.

In some implementations, one or more transceivers may receive an indication of the device delay from the device (e.g., indication of device delay 418). The device may determine and self-report the device delay. The device delay can account for various delays associated with the device, such as a processing time and a switching time.

In particular implementations, a propagation delay between the one or more transceivers and the device can be determined. In certain implementations, the propagation delay can be determined by utilizing Timing Advance (TA) principles. For example, a radio signal may be transmitted to the device that specifies a predetermined time period in which the device should transmit a response (e.g., a preamble). When the response is received from the device, the RTT can be calculated by comparing the predetermined time period to the actual time period in which the preamble is received. For example, an timing request (e.g., timing request 420) can be transmitted to the device, an timing response (e.g., timing response 422) can be received from the device, and the propagation delay can be derived from the timing request and/or the timing response. For example, a Round Trip Time (RTT) can be calculated based on the timing request and/or the timing response. The propagation delay may include a downlink propagation delay and an uplink propagation delay, in some cases.

At 804, a guard time based at least in part on the delay(s) is calculated. In some cases, the guard time may be greater than or equal to a sum of the device delay and the propagation delay. In certain implementations, the guard time may be calculated based at least in part on a Sub-Carrier Spacing (SCS) selected for a wireless resource. In some implementations, the guard time may be equal to the duration of an integer number of symbols in the wireless resource. For example, the guard time may include a time duration equal to the sum of the device delay and the propagation delay rounded up to the nearest symbol. In some implementations, the guard time may be shorter than or equal to a sum of the device delay, the propagation delay, and a duration of one of the symbols in the wireless resource.

At 806, a wireless resource is scheduled to include the guard time. In some implementations, the wireless resource can be scheduled to include the guard time between a downlink interval and an uplink interval. For example, the guard time is scheduled at a time interval after the downlink interval and before the uplink interval. Each one of the downlink interval and the uplink interval may include an integer number of symbols of the wireless resource, in some cases. In some implementations, downlink data and uplink data are further transmitted via the wireless resource according to the schedule determined at 806.

In some implementations, process 800 can be repeated periodically, or in response to a trigger event. In some instances, process 800 is triggered when the delay(s) associated with the device are determined to have changed. For example, the device may have a changed device delay because of a change in its processing time (e.g., the device has begun to devote a different amount of processing resources to processing downlink data) or a change in its switching time (e.g., due to a malfunction of a transceiver of the device), or may have a different propagation delay due to a change in the RTT associated with the device (e.g., the device has changed location). In some implementations, process 800 can be repeated such that it includes determining that the delay has changed, recalculating the guard time based at least in part on the delay, and, in response to recalculating the guard time, rescheduling the wireless resource to include the guard time.

FIG. 9 illustrates a process 900 for dynamically selecting a guard time according to a Sub-Carrier Spacing (SCS) according to implementations of the present disclosure. Process 900 may be performed by a base station, in some cases.

At 902, a request for services is received from a User Equipment (UE). In some examples, the request for services may correspond to the request for services 410, which is described above with reference to FIG. 4.

In particular implementations, the request for services can be omitted from process 900. In some cases, the services are initiated by a third party. In certain implementations, a request to deliver services to the UE is received from the third party. For example, a device (e.g., a media server) may transmit, to the base station 402, a request to deliver a push notification to the UE, a request to setup a voice call originating from another UE, or the like.

At 904, a capability of the UE is determined. In some instances, the capability is determined based on the request received at 902. For example, the request for services may be a request for 5G services, which indicates that the UE is 5G-capable. In particular implementations, the capability is determined by transmitting a request for the capability (e.g., request for capabilities 412) to the UE and receiving an indication of the capability (e.g., indication of device capabilities 414).

The capability may be a first capability or a second capability. In some implementations, the first capability indicates that the UE is 5G-capable, and the second capability indicates that the UE is 4G-capable. In some instances, the second capability indicates that the UE is 5G-incapable.

If the UE is determined to have the first capability at 904, the process 900 continues to 906. At 906, a type of services being requested is determined. In some implementations, the type of services being requested can be a first type or a second type. In particular instances, the first type can be any type of services selected from a group including Ultra Reliable Low Latency Communication (URLLC) services, enhanced Mobile Broadband (eMBB) services, and massive Machine Type Communication (mMTC). The second type can be any type of services selected from the group, where the first type and the second type are different types of services.

In some examples, the UE may be requesting multiple types of services. In certain cases, the type of requested services with the most stringent requirements is determined at 906. For example, if the request is for some Internet browsing services and some URLLC services, the URLLC services has more stringent latency requirements than the Internet browsing services.

If the type of services determined at 906 is a first type of services, a first SCS is selected at 908. For example, the first SCS may be selected when the type of services are URLLC services.

If, on the other hand, the type of services determined at 906 is a second type of services, a second SCS is selected at 910. For example, the second SCS may be selected when the type of services are eMBB services. In various implementations, the second SCS may be different than the first SCS. In some instances, the selected SCS may determine a duration of a wireless resource (e.g., a slot), as well as a duration of a symbol in the wireless resource (e.g., an Orthogonal Frequency Dimension Multiplexing (OFDM) symbol). In various implementations, the first SCS may be larger than the second SCS, and the first SCS may be associated with a shorter symbol duration than a symbol duration associated with the second SCS.

In some implementations, the SCS may be selected based on the following equation: $\Delta f = 2^\mu * 15$ kHz, where $\Delta f$ is a frequency interval of the wireless resource (e.g., the SCS) and µ is an integer. For certain 5G New Radio (NR) wireless resources, each one of the first SCS can be any of 15 kHz and the duration of each symbol can be 66.67 microseconds; 30 kHz and the duration of each symbol can be 33.33 microseconds; 60 kHz and the duration of each symbol can be 16.67 microseconds; 120 kHz and the duration of each symbol can be 8.33 microseconds; 240 kHz and the duration of each symbol can be 4.17 microseconds; or the like.

If the capability of the UE determined at 904 is a second capability, the process 900 continues to 912. At 912, a third SCS is selected. The third SCS may be different from the first SCS and the second SCS, in some implementations. In some examples in which the second capability is a 4G LTE capability, the third SCS can be 15 kHz, and the duration of each symbol in the wireless resource is 66.67 microseconds.

The process 900 converges at 914. At 914, a guard time is selected based on the SCS selected at 908, 910, or 912. In some instances, the selected SCS determines a duration of any symbol in the wireless resource and the guard time includes an integer number of symbols in the wireless resource. The guard time may be a minimum number of symbols that accommodates at least one delay (e.g., a processing time, a switching time, a device delay, etc.) associated with the UE.

EXAMPLE CLAUSES

A. A method comprising: determining a delay associated with a device; calculating a guard time based at least in part on the delay; and scheduling a wireless resource to include a downlink interval, an uplink interval, and the guard time between the downlink interval and the uplink interval.

B. A method of example A, wherein determining the delay comprises determining a propagation delay associated with the device by determining a Round Trip Time (RTT) between one or more transceivers and the device.

C. A method of example A or B, wherein calculating the guard time based at least in part on the delay comprises selecting one or more symbols in the wireless resource having a duration that is longer than the delay.

D. A method of any of examples A-C, wherein calculating the guard time based at least in part on the delay comprises selecting one or more symbols in the wireless resource having a duration that is shorter than a sum of the delay and a duration of one of the symbols of the wireless resource.

E. A method of any of examples A-D, wherein determining the delay comprises determining a device delay by receiving, from the device, an indication of the device delay.

F. A method of any of examples A-E, further comprising: receiving, from the device, a request for services or transmitting, to the device, the request for services.

G. A method of example F, further comprising: selecting a Sub-Carrier Spacing (SCS) based at least in part on the services.

H. A method of example G, wherein calculating the guard time comprises calculating the guard time based at least part on the SCS.

I. A method of any of examples A-H, further comprising: transmitting, to the device using the wireless resource, downlink data during the downlink interval.

J. A method of any of examples A-I, further comprising: causing the device to transmit, using the wireless resource, uplink data during the uplink interval.

K. A method of any of examples A-J, further comprising: determining that the delay has changed.

L. A method of example K, further comprising: in response to determining that the delay has changed, recalculating the guard time based at least in part on the delay.

M. A method of example L, further comprising: in response to recalculating the guard time, rescheduling the wireless resource to include the guard time.

N. A method of any of examples A-M, wherein the delay includes a processing time and a switching time.

O. A method of example N, wherein the processing time is based at least partly on a type of services delivered to the device.

P. A method, comprising: causing one or more transceivers to receive, from a device, a message indicating a device delay; determining a propagation delay between the one or more transceivers and the device; calculating a guard time based at least in part on the device delay and the propagation delay; scheduling a wireless resource to include a downlink interval, an uplink interval, and the guard time between the downlink interval and the uplink interval; causing the one or more transceivers to transmit, to the device using the wireless resource, downlink data during the downlink interval; and causing the device to transmit, to the one or more transceivers using the wireless resource, uplink data during the uplink interval.

Q. A method of example P, wherein the device delay comprises a processing time and a switching time.

R. A method of example P or Q, wherein calculating the guard time based at least in part on the device delay and the propagation delay comprises selecting one or more symbols in the wireless resource having a duration that is greater than or equal to a sum of the propagation delay and the device delay.

S. A method of any of examples P-R, further comprising: causing the one or more transceivers to receive, from the device, a request for services; selecting a Sub-Carrier Spacing (SCS) based at least in part on the services; and determining the duration of the one or more symbols based at least in part on the SCS.

T. A system comprising one or more processors configured to perform operations, the operations comprising a method of any of examples A-S.

U. A system of example S comprising: a memory; and one or more components stored in the memory and executable by the one or more processors to perform operations comprising a method of any of examples A-S.

V. A system of example T or U comprising one or more transceivers.

W. A non-transitory computer-readable medium storing instructions to perform a method of any of examples A-S.

CONCLUSION

Although the subject matter has been described in language specific to structural features and/or methodological acts, it is to be understood that the subject matter described in this disclosure is not necessarily limited to any of the specific features or acts described. Rather, the specific features and acts are disclosed as examples and implementations of the present disclosure.

What is claimed is:
1. A system comprising:
one or more transceivers;
one or more processors;
a memory; and
one or more components stored in the memory and executable by the one or more processors to perform operations comprising:

causing the one or more transceivers to receive, from a device, a request for services; and selecting a Sub-Carrier Spacing (SCS) based at least in part on the services;

determining a device delay associated with at least one of a processing time or a switching time of the device;

calculating a guard time based at least in part on the device delay and on the SCS; and scheduling a wireless resource to include a downlink interval, an uplink interval, and the guard time between the downlink interval and the uplink interval.

2. The system of claim 1, further comprising:

determining a propagation delay associated with the device by determining a Round Trip Time (RTT) between the one or more transceivers and the device, wherein the calculating the guard time is further based at least in part on the propagation delay associated with the device.

3. The system of claim 1, wherein calculating the guard time based at least in part on the device delay comprises selecting one or more symbols in the wireless resource having a duration that is longer than the device delay.

4. The system of claim 1, wherein calculating the guard time based at least in part on the device delay comprises selecting one or more symbols in the wireless resource having a first duration that is shorter than a sum of the device delay and a second duration of one of the symbols of the wireless resource.

5. The system of claim 1, wherein determining the device delay comprises receiving, from the device, an indication of the device delay.

6. The system of claim 1, further comprising:

transmitting, to the device using the wireless resource, downlink data during the downlink interval; and causing the device to transmit, using the wireless resource, uplink data during the uplink interval.

7. A method comprising:

receiving, from a device, a request for services;

selecting a Sub-Carrier Spacing (SCS) based at least in part on the services;

determining a device delay associated with at least one of a processing time or a switching time of the device;

calculating a guard time based at least in part on the device delay and on the SCS; and scheduling a wireless resource to include a downlink interval, an uplink interval, and the guard time between the downlink interval and the uplink interval.

8. The method of claim 7, further comprising:

determining a propagation delay associated with the device by determining a Round Trip Time (RTT) between one or more transceivers and the device, wherein the calculating the guard time is further based at least in part on the propagation delay associated with the device.

9. The method of claim 7, wherein calculating the guard time based at least in part on the device delay comprises selecting one or more symbols in the wireless resource having a duration that is longer than the device delay.

10. The method of claim 7, wherein calculating the guard time based at least in part on the device delay comprises selecting one or more symbols in the wireless resource having a first duration that is shorter than a sum of the device delay and a second duration of one of the one or more symbols of the wireless resource.

11. The method of claim 7, wherein determining the device delay comprises receiving, from the device, an indication of the device delay.

12. The method of claim 7, further comprising:

transmitting, to the device using the wireless resource, downlink data during the downlink interval; and causing the device to transmit, using the wireless resource, uplink data during the uplink interval.

13. The method of claim 7, further comprising:

determining that the device delay has changed;

in response to determining that the device delay has changed, recalculating the guard time based at least in part on the device delay; and in response to recalculating the guard time, rescheduling the wireless resource to include the guard time.

14. One or more non-transitory computer-readable storage media storing instructions that, when executed by a processor, cause the processor to perform operations comprising:

causing one or more transceivers to receive, from a device, a request for services;

selecting a Sub-Carrier Spacing (SCS) based at least in part on the services;

determining a device delay associated with at least one of a processing time or a switching time of the device;

calculating a guard time based at least in part on the device delay and on the SCS; and scheduling a wireless resource to include a downlink interval, an uplink interval, and the guard time between the downlink interval and the uplink interval.

15. The one or more non-transitory computer-readable storage media of claim 14, further comprising:

determining a propagation delay associated with the device by determining a Round Trip Time (RTT) between the one or more transceivers and the device, wherein the calculating the guard time is further based at least in part on the propagation delay associated with the device.

16. The one or more non-transitory computer-readable storage media of claim 14, wherein calculating the guard time based at least in part on the device delay comprises selecting one or more symbols in the wireless resource having a duration that is longer than the device delay.

17. The one or more non-transitory computer-readable storage media of claim 14, wherein calculating the guard time based at least in part on the device delay comprises selecting one or more symbols in the wireless resource having a first duration that is shorter than a sum of the device delay and a second duration of one of the symbols of the wireless resource.

18. The one or more non-transitory computer-readable storage media of claim 14, wherein determining the device delay is based at least in part on an indication of the device delay, the indication being received from the device by the one or more transceivers.

19. The one or more non-transitory computer-readable storage media of claim 14, wherein the operations further comprise:

causing the one or more transceivers to transmit, to the device using the wireless resource, downlink data during the downlink interval; and causing the device to transmit, using the wireless resource, uplink data during the uplink interval.

20. The one or more non-transitory computer-readable storage media of claim 14, wherein the operations further comprise:

determining that the device delay has changed;

in response to determining that the device delay has changed, recalculating the guard time based at least in part on the device delay; and in response to recalculating the guard time, rescheduling the wireless resource to include the guard time.

* * * * *